US010887404B2

United States Patent
Qiu et al.

(10) Patent No.: US 10,887,404 B2
(45) Date of Patent: *Jan. 5, 2021

(54) METHOD AND APPARATUS FOR VIRTUALIZED NETWORK FUNCTION CHAINING MANAGEMENT

(71) Applicant: AT&T Intellectual Property I, L.P., Atlanta, GA (US)

(72) Inventors: Chaoxin Qiu, Austin, TX (US); Mark A. Ratcliffe, Oakhurst, NJ (US); Jeffrey L. Scruggs, Round Rock, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,157

(22) Filed: Aug. 19, 2019

(65) Prior Publication Data
US 2019/0373065 A1     Dec. 5, 2019

Related U.S. Application Data (63) Continuation of application No. 15/900,191, filed on Feb. 20, 2018, now Pat. No. 10,432,736, which is a continuation of application No. 15/587,019, filed on May 4, 2017, now Pat. No. 9,930,127, which is a continuation of application No. 14/629,773, filed on Feb. 24, 2015, now Pat. No. 9,674,639.

(51) Int. Cl.
*H04L 29/08*     (2006.01)
*H04W 4/60*      (2018.01)

(52) U.S. Cl.
CPC .............. *H04L 67/16* (2013.01); *H04L 67/10* (2013.01); *H04W 4/60* (2018.02)

(58) Field of Classification Search
CPC ........... H04W 4/60; H04L 67/10; H04L 67/16
See application file for complete search history.

(56) References Cited

U.S. PATENT DOCUMENTS

| | | |
|---|---|---|
| 8,412,810 B1 | 4/2013 | Tompkins |
| 8,589,543 B2 | 11/2013 | Dutta et al. |
| 8,769,644 B1 | 7/2014 | Eicken et al. |
| 8,813,225 B1 | 8/2014 | Fuller et al. |
| 8,825,817 B1 | 9/2014 | Jaisinghani et al. |

(Continued)

OTHER PUBLICATIONS

"AT&T Vision Alignment Challenge Technology Survey," AT&T Domain 2.0 Vision White Paper, Nov. 13, 2013, 22 pgs.

(Continued)

*Primary Examiner* — Abdullahi E Salad
(74) *Attorney, Agent, or Firm* — Amin, Turocy & Watson, LLP (57) ABSTRACT

A method for vNF chaining management includes receiving virtualized network function (vNF) information from a chaining client associated with a particular vNF. A service chaining catalog is updated based on the vNF information and chaining information is transmitted to peering vNFs of the particular vNF. The vNF information can indicate instantiation of a vNF and identify peering vNFs. Updates received from vNFs can be used to update the chaining catalog. Updated vNF information can then be sent to peering vNFs of the vNF which sent the update.

20 Claims, 8 Drawing Sheets

(56) References Cited

U.S. PATENT DOCUMENTS

| | | | |
|---|---|---|---|
| 2013/0166752 A1 | 6/2013 | Kim et al. | |
| 2014/0047437 A1 | 2/2014 | Wu et al. | |
| 2014/0201374 A1* | 7/2014 | Ashwood-Smith | H04L 49/70 709/226 |
| 2014/0237111 A1 | 8/2014 | Mcmurry et al. | |
| 2014/0317261 A1* | 10/2014 | Shatzkamer | G06F 9/45558 709/223 |
| 2015/0124582 A1* | 5/2015 | Campbell | H04W 76/34 370/216 |
| 2016/0103698 A1* | 4/2016 | Yang | G06F 11/3006 714/4.11 |
| 2016/0119417 A1* | 4/2016 | Fang | H04L 67/16 709/219 |
| 2016/0149771 A1* | 5/2016 | Prasad | H04L 41/12 709/226 |
| 2017/0093749 A1* | 3/2017 | Hoffmann | H04L 47/783 |

OTHER PUBLICATIONS

"Cloudband with Openstack as NFV Platform," Strategic White Paper, NFV Insights Series, Aug. 2014, 11 pgs.

\* cited by examiner

METHOD AND APPARATUS FOR VIRTUALIZED NETWORK FUNCTION CHAINING MANAGEMENT

This application is a continuation of prior U.S. patent application Ser. No. 15/900,191, filed on Feb. 20, 2018, which issued on Oct. 1, 2019 as U.S. Pat. No. 10,432,736, and which is a continuation of prior U.S. patent application Ser. No. 15/587,019, filed on May 4, 2017, which issued on Mar. 27, 2018 as U.S. Pat. No. 9,930,127, and which is a continuation of application Ser. No. 14/629,773 filed on Feb. 24, 2015, which issued on Jun. 6, 2017 as U.S. Pat. No. 9,674,639, the disclosures of which applications and patents are herein incorporated by reference in their respective entireties.

BACKGROUND

The present disclosure relates generally to virtualized network functions, and more particularly to management of virtualized network functions to alert existing virtualized network functions to instantiation of new virtualized network functions and to changes to existing virtualized network functions.

Virtualization is the creation and/or use of a virtualized machine to replace something that could be implemented using hardware. A virtualized machine is a software based container that represents a set of computing resources such as one or more central processing unit cores, memory, storage, network interfaces, etc. A virtualized machine provides an execution environment for software applications in a manner similar to the hardware components the virtualized machine replaces. For example, a virtualized machine can be used to emulate the functioning of a physical machine, such as a specific type of computer. A virtualized application is an application that can run on a virtualized machine independent of a physical computer that the virtualized machine is running on.

A virtualized network function typically consists of a set of various types of virtualized applications that run on a set of virtualized machines that can be run on a set of physical servers. For example, a call processing virtualized network function may consist of one or more system controller virtualized applications, one or more session initiation protocol processing virtualized applications, one or more Diameter AAA virtualized applications, and one more accounting virtualized applications. A virtualized network function instance is a particular instantiation of a virtualized network function with a particular set of required virtualized application instances of various virtualized application types.

An orchestrator can be used to manage the instantiation (i.e., creation) of new virtualized network functions and interactions between virtualized network functions (e.g., peering virtualized network functions). Several pieces of hardware may be used to form a system for a particular purpose. Similarly, several virtualized network functions, each used to replace one or more pieces of hardware, can be used to form a system. The orchestrator is used to control and manage the virtualized components of the system.

Virtualized network functions, can be used to implement an end-to-end service infrastructure. When an orchestrator instantiates a new instance of a particular virtualized network function (vNF), the new vNF and surrounding peering vNFs need to be made aware of each other in order for the new vNF to be integrated into an end-to-end service infrastructure. This process is referred to as "chaining." Many aspects of chaining needs cannot be supported by using traditional Domain Name Service (DNS) or Internet Protocol (IP) load balancers. Although this process can be accomplished by carefully planned configuration processes across a network, such a process is slow and time consuming. In addition, DNS and IP load balancers cannot support chaining needs such as an application access control list that specifies which instances of peering virtualized network functions can be allowed to access a particular virtualized network function; traffic throttling; priority differentiation and overload control of different types of application level communication messages between peering virtualized network functions; and application traffic flow configured to take advantage of location proximity.

SUMMARY

In one embodiment, a method for virtualized network function (vNF) chaining management includes receiving vNF information from a chaining client associated with a particular vNF. A service chaining catalog is updated based on the vNF information and chaining information is transmitted to peering vNFs of the particular vNF. The vNF information can indicate instantiation of a vNF and identify peering vNFs. In one embodiment, updated vNF information is received from a chaining client associated with the particular vNF. The service chaining catalog is updated based on the updated vNF information and updated chaining information is transmitted to peering vNFs of the particular vNF. In one embodiment, a request to remove a particular virtualized network function is received and the service chaining catalog is updated based on the request. Updated chaining information is then transmitted to peering vNFs of the particular vNF indicating that the particular vNF has been removed. In one embodiment, the request to remove a particular vNF is received from a vNF to be removed or a network management system. In one embodiment, a request for updated vNF function information is transmitted to a plurality of chaining clients associated with respective vNFs. Updated vNF information received is used to update the service chaining catalog and can be transmitted to each of the plurality of chaining clients.

A system and computer readable medium for vNF chaining management are also described herein.

DETAILED DESCRIPTION

The present disclosure pertains to virtualized network function (vNF) chaining management. A vNF chaining manager server tracks instantiation and updates of vNFs in a virtualized service platform. A vNF chaining manager executed on the chaining manager server receives information from a vNF chaining client of a vNF when the vNF is instantiated. The vNF chaining manager stores this information and also transmits specific information about the newly instantiated vNF as necessary to peering vNFs of the newly instantiated vNF. This transmission of specific information allows peering vNFs of the newly instantiated vNF to become aware of the newly instantiated vNF so that the peering vNFs can interact with the newly instantiated vNF. Similarly, when configuration of a vNF is updated or changed, the updated or changed vNF provides information to the vNF chaining manager which transmits specific information as necessary to the peering vNFs of the changed vNF.

Figure 1:
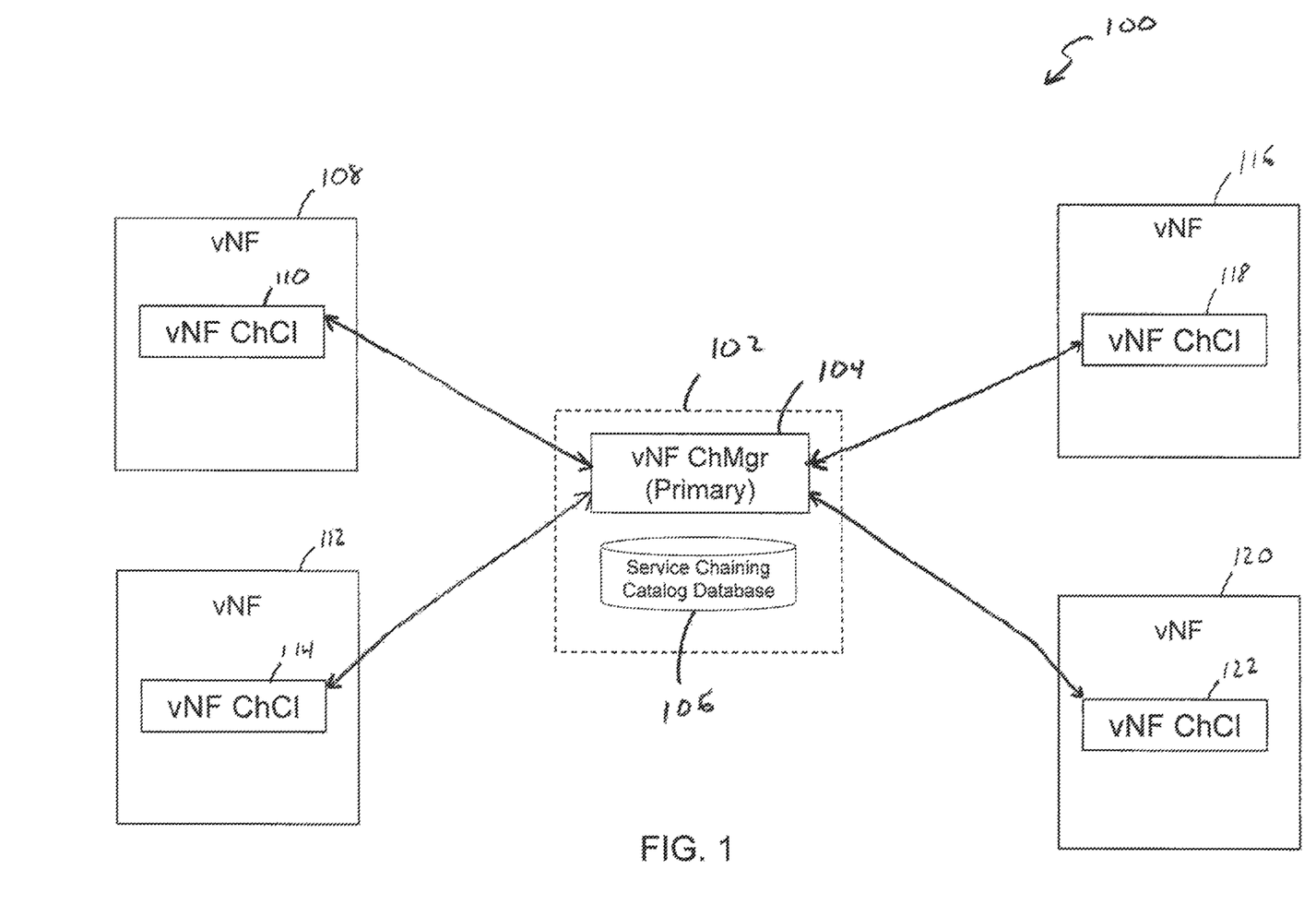
FIG. 1 depicts a system for virtualized network chaining management according to one embodiment.

FIG. 1 depicts a system 100 for virtualized network chaining management comprising a chaining manager server 102. Chaining manager server 102 provides a centralized point for vNFs of a virtualized service platform to exchange configuration information that is necessary for inter-vNF chaining. In one embodiment, chaining manager server 102 comprises a vNF chaining manager 104 and database 106. vNF chaining manager is in communication with database 106. A service chaining catalog stored in database 106 contains information pertaining to vNF chaining profiles that are used to describe configuration parameters that are needed to properly integrate a vNF with peer vNFs. In one embodiment, chaining manager server 102 is a server but can be other types of computers such as a desktop, laptop, etc. In one embodiment, chaining manager server 102 can be implemented on a virtual machine to become a virtualized network function.

vNF chaining manager 104 is in communication with one or more vNF chaining clients each of which are associated with a virtual network function. FIG. 1 depicts vNFs 108, 112, 116, 120 each having vNF chaining clients 110, 114, 118, 122, respectively. In one embodiment, each of vNF chaining clients 110, 114, 118, 122 and vNF chaining manager 104 are executed on the same server (or computer). In such embodiments, each of vNF chaining clients 110, 114, 118, 122 is in communication with vNF chaining manager via wired methods (e.g., internal computer hardware wiring). In other embodiments, each of vNF chaining clients 110, 114, 118, 122 and vNF chaining manager 104 can be located on different computers (also referred to as compute nodes, computing host servers, and/or hosts). In such embodiments, each of vNF chaining clients 110, 114, 118, 122 is in communication with vNF chaining manager via wired or wireless methods over a network such as a local area network or a wide area network.

In one embodiment, vNF chaining manager 104 communicates with one or more of vNF chaining clients 110, 114, 118, 122 via an information exchange protocol to enable exchange of configuration parameters that are needed for a particular vNF to integrate with surrounding peers (e.g., for each vNF to become aware of and communicate with other vNFs as necessary.) In one embodiment, the information exchange protocol comprises seven message types: ADD_NEW; SUBSCRIBE; UPDATE; REMOVE; NOTIFY; NOTIFY_LIST; and REQUEST_UPDATE. Each of these messages and communications among the vNF chaining manager and vNF chaining clients are described in further detail below.

The ADD_NEW message, in one embodiment, is a message transmitted from a vNF chaining client to the vNF chaining manager to identify the instantiation of a new vNF chaining client via an orchestration mechanism to the vNF chaining manager. The ADD_NEW message, in one embodiment, contains configuration information concerning the newly instantiated vNF from which the ADD_NEW message is sent.

The SUBSCRIBE message, in one embodiment, is a message transmitted from a vNF chaining client to a vNF chaining manager. The SUBSCRIBE message, in one embodiment, is a request for information from a newly instantiated vNF concerning vNFs that are considered peers of the newly instantiated vNF. For example, peers of a newly instantiated vNF may be other vNFs that the newly instantiated vNF needs to interact with such as receiving and or transmitting information.

The UPDATE message, in one embodiment, is a message transmitted from a vNF chaining client to a vNF chaining manager. When a vNF's configuration is changed, it directs its vNF chaining client to send an UPDATE message to the vNF chaining manager to report its new configuration and to provide any updated configuration information that may be needed by peers of the updated vNF. In one embodiment, upon receiving an UPDATE message, the vNF manager sends updated configuration information of the modified vNF to vNF chaining clients of existing peering vNFs using NOTIFY messages.

The NOTIFY message, in one embodiment, is a message transmitted from a vNF chaining manager to a vNF chaining client. The NOTIFY message, in one embodiment, is used to transmit configuration information of a modified vNF to vNF chaining clients of existing peering vNFs of a vNF whose modification triggered the NOTIFY message to be transmitted.

The REMOVE message, in one embodiment, is a message transmitted from a vNF chaining client to the vNF chaining manager. The REMOVE message, in one embodiment, is transmitted by a vNF chaining client to a vNF chaining manager in response to an instruction from a vNF associated with the vNF chaining client when the vNF associated with the chaining client is to be removed and/or disabled from service. In one embodiment, upon receiving a REMOVE message for a particular vNF, the vNF chaining manager transmits a NOTIFY message to vNF chaining clients of existing peering vNFs to inform them that the particular vNF is no longer in service. In one embodiment, a REMOVE message can be transmitted by a network management server to the vNF chaining manager.

The NOTIFY_LIST message, in one embodiment, is a message transmitted from a vNF chaining manager to one or more vNF chaining clients. In one embodiment, a NOTIFY_LIST message comprises configuration information of peering vNFs of a particular vNF and is transmitted from the vNF chaining manager in response to receipt of a SUBSCRIBE message from the particular vNF chaining client.

The REQUEST_UPDATE message, in one embodiment, is a message transmitted from a vNF chaining manager to one or more vNF chaining clients in order to request the latest configuration information from each vNF chaining client. In one embodiment, in response to the REQUEST_UPDATE message, a vNF chaining client sends an UPDATE message to the vNF chaining manager. In one embodiment, the vNF chaining manager can send a NOTIFY_LIST message comprising configuration information for peering vNFs of a particular vNF chaining client to the particular vNF chaining client.

FIGS. 2 through 6 depict call flows for a number of different scenarios.

Figure 2:
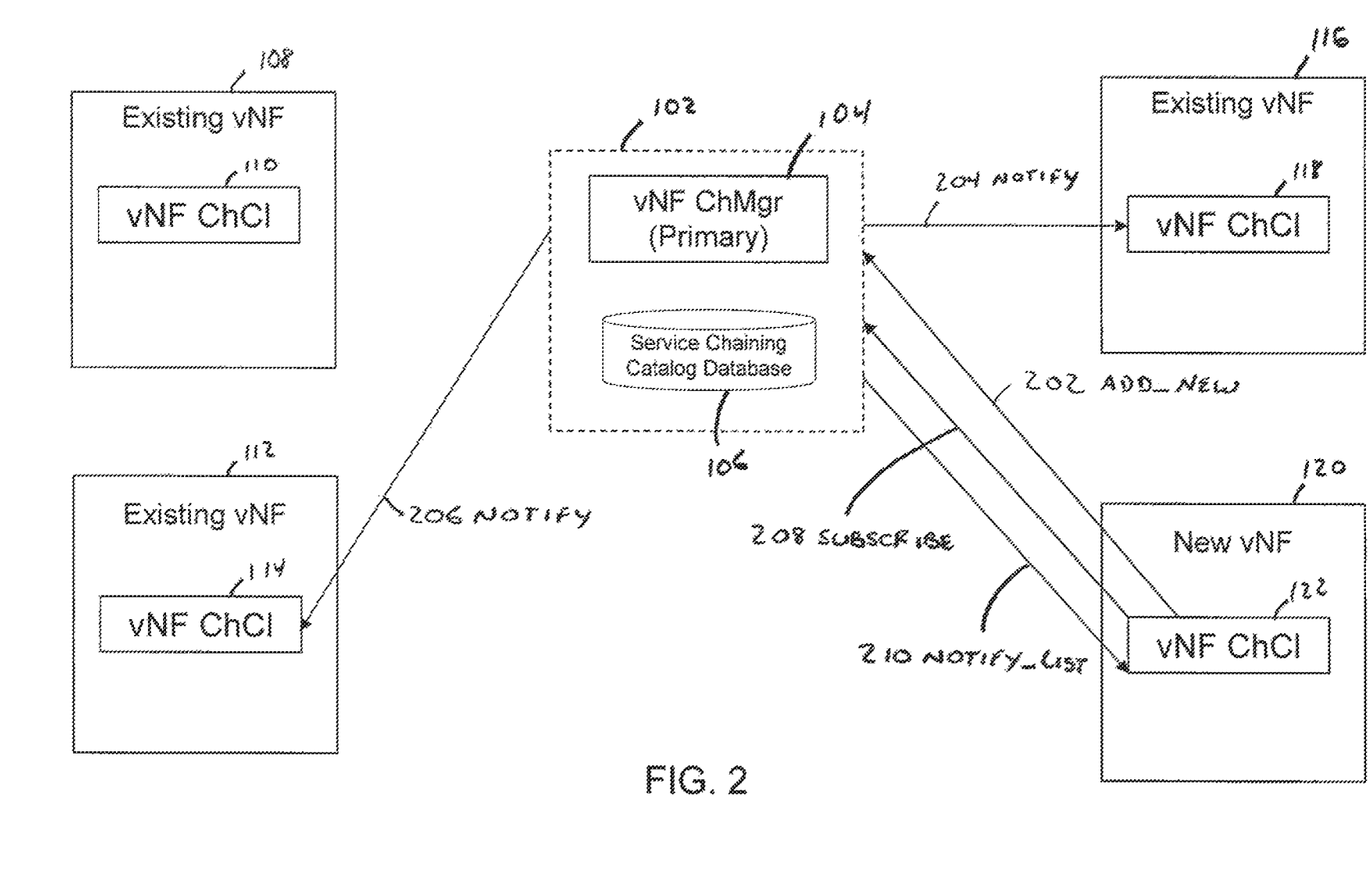
FIG. 2 depicts a call flow of messages transmitted among multiple vNF chaining clients and a vNF chaining manager according to an embodiment when a new vNF is instantiated.

FIG. 2 depicts a call flow of messages transmitted among multiple vNF chaining clients and a vNF chaining manager according to one embodiment when a new vNF is instantiated. Each of vNF chaining clients 110, 114, 118, 122 is in communication with vNF chaining manager 104 as previously described in connection with FIG. 1. In the embodiment shown in FIG. 2, vNFs 108, 112, 116 are designated as "existing" vNFs while vNF 120 is being instantiated and is designated as a "new" vNF. New vNF 120 indicates to its associated vNF chaining client 122 that it is being instantiated. In response, at step 202, vNF chaining client 122 transmits an ADD_NEW message to vNF chaining manager 104. In response to the ADD_NEW message, vNF manager stores configuration information related to new vNF 120 and also transmits NOTIFY messages to existing vNFS 112 and 116 at steps 204 and 206. The NOTIFY messages are sent to existing vNFs 112 and 116 based on information from chaining client 122 of vNF 120 which indicates what vNFs are peeing vNFs of vNF 120. In one embodiment, vNF chaining manager 104 transmits an acknowledgment message (not shown) to vNF 120 in response to receipt of the ADD_NEW message of step 202. vNF chaining client 122 transmits a SUBSCRIBE message to vNF chaining manager 104 at step 208 in response to the acknowledgement message in order to receive information about peering vNFs. In response to the SUBSCRIBE MESSAGE, vNF chaining manager 104 transmits a NOTIFY_LIST message to vNF chaining client 122 at step 210.

Figure 3:
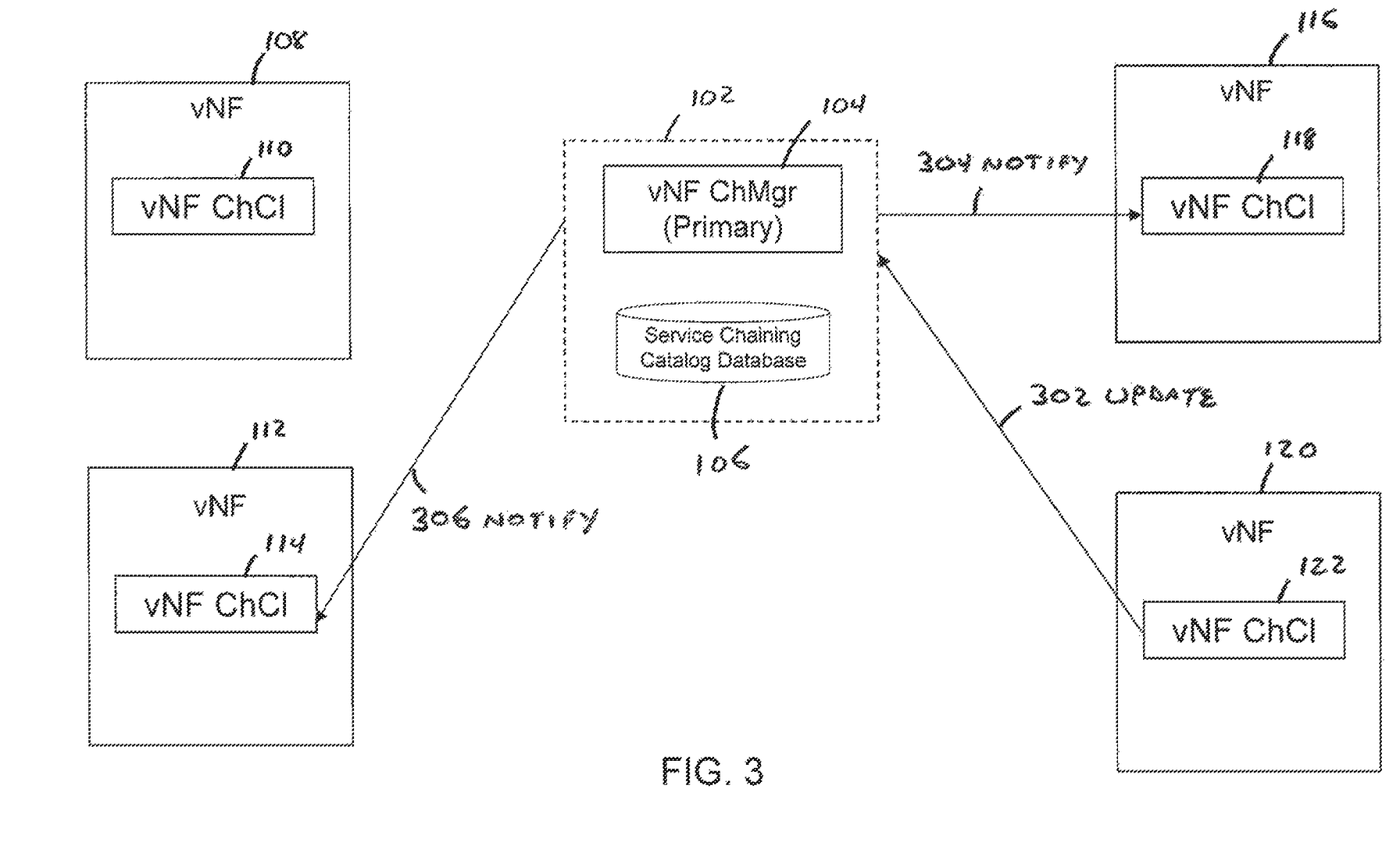
FIG. 3 depicts a call flow of messages transmitted among multiple vNF chaining clients and a vNF chaining manager according to one embodiment when there is a change to a vNFs configuration.

FIG. 3 depicts a call flow of messages transmitted among multiple vNF chaining clients and a vNF chaining manager according to one embodiment when there is a change to a vNFs configuration. At step 302, vNF chaining client 122 transmits an UPDATE message to vNF chaining manager 104 in response to an indication from vNF 120 that its configuration has been changed. In response to receipt of the UPDATE message, vNF chaining manager 104 transmits a NOTIFY message to vNF chaining client 118 at step 304 and to vNF chaining client 114 at step 306 in order to transmit the configuration information of vNF 120. In one embodiment, NOTIFY messages are transmitted to vNF chaining clients 118 and 114 based on the associated vNFs 116 and 112 being peering vNFs of vNF 120.

Figure 4:
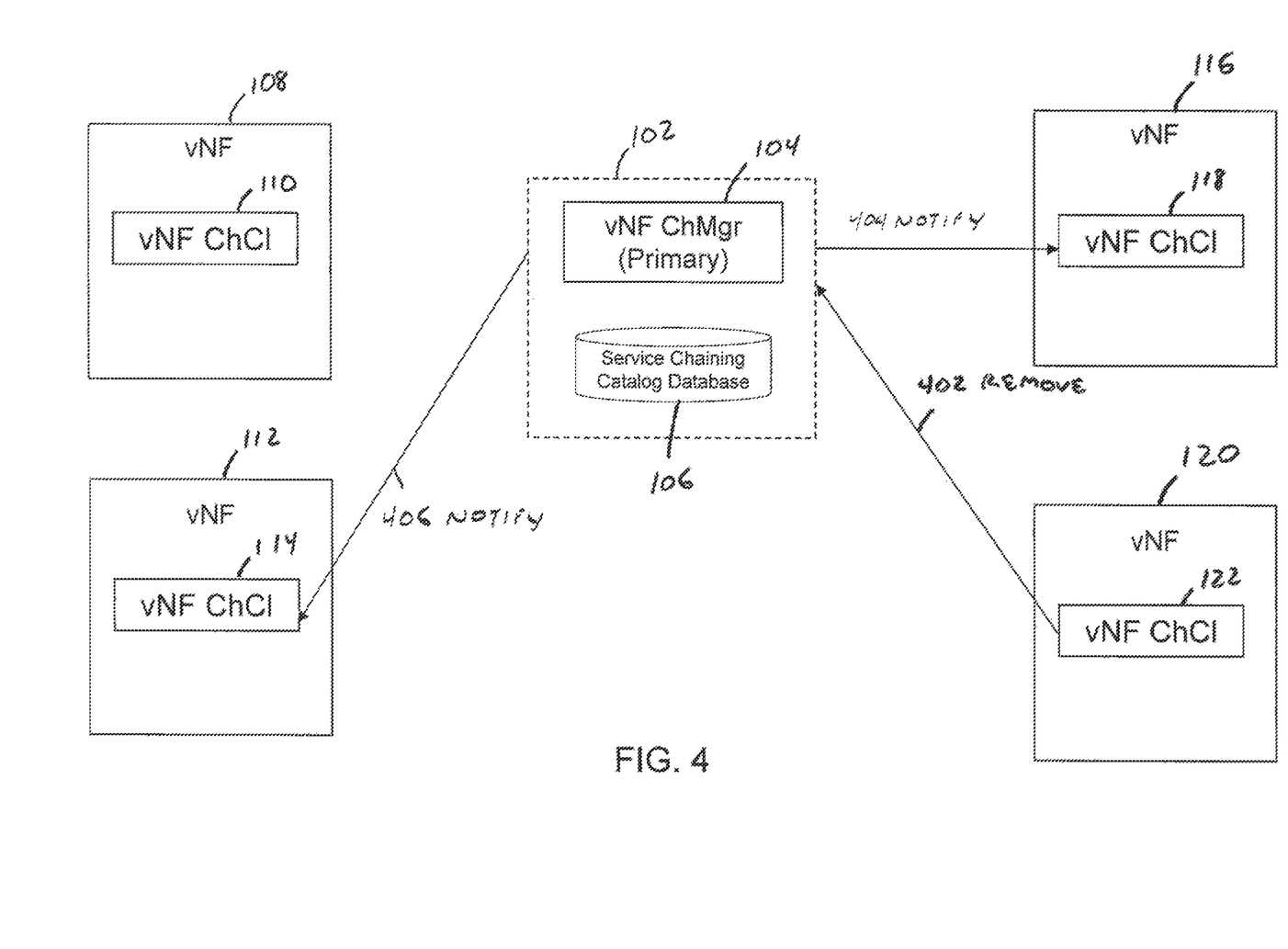
FIG. 4 depicts a call flow of messages transmitted among multiple vNF chaining clients and a vNF chaining manager according to one embodiment when a vNF is to be taken out of service and/or removed from a virtual service platform.

FIG. 4 depicts a call flow of messages transmitted among multiple vNF chaining clients and a vNF chaining manager according to one embodiment when a vNF is to be taken out of service and/or removed from a virtual service platform. vNF chaining client 122 transmits a REMOVE message at step 402 in response to an indication from vNF 120 that the vNF is to be taken out of service and/or removed from a virtual service platform. In response to the REMOVE message, vNF chaining manager 104 transmits NOTIFY messages to vNF chaining client 118 at step 404 and to vNF chaining client 114 at step 406.

Figure 5:
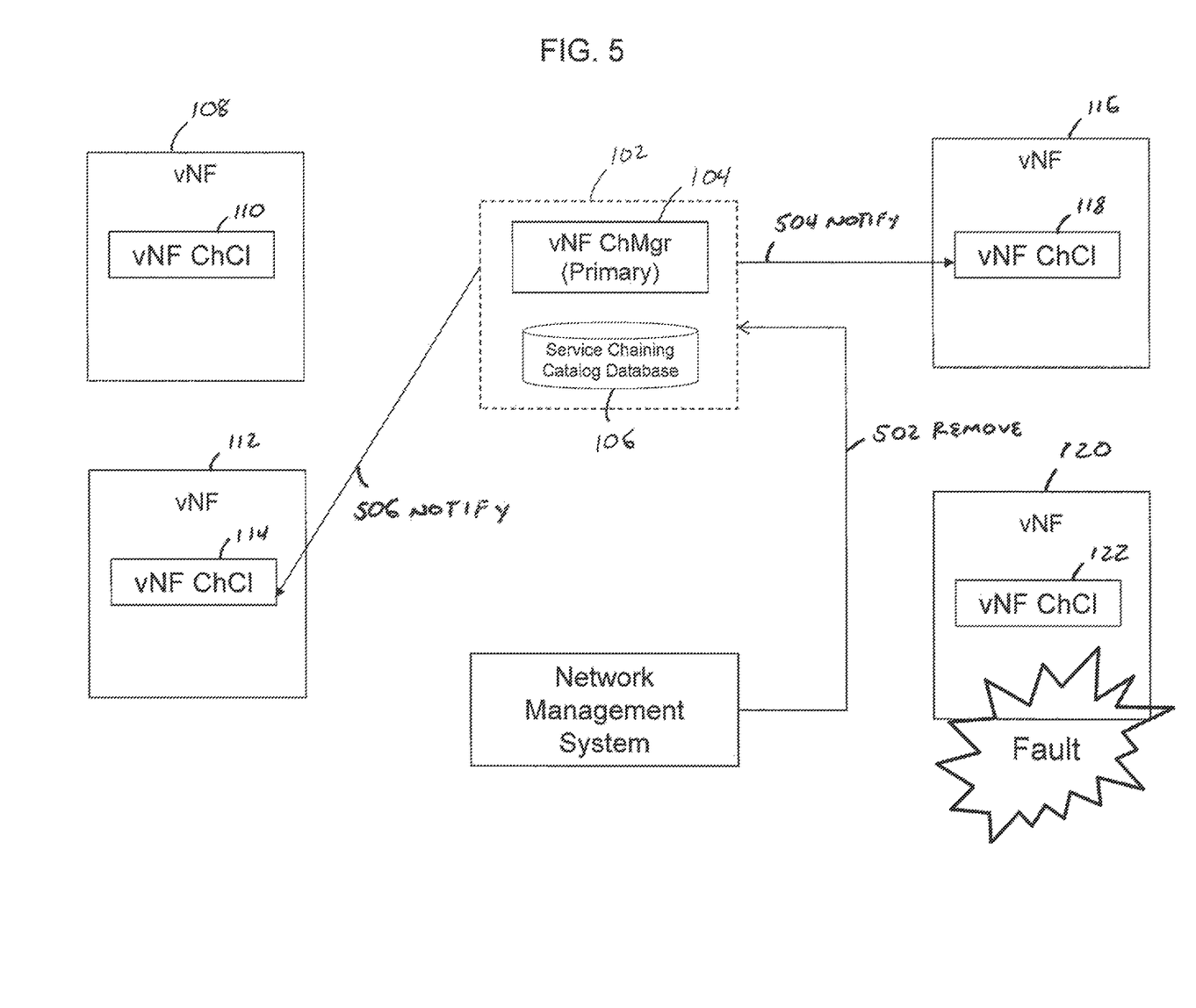
FIG. 5 depicts a call flow of messages transmitted among multiple vNF chaining clients, a vNF chaining manager, and a network management system according to one embodiment when a vNF fails.

FIG. 5 depicts a call flow of messages transmitted among multiple vNF chaining clients, a vNF chaining manager, and a network management system according to one embodiment when a vNF fails. In one embodiment, network management system 124 monitors various vNFs including vNF 120. When network management system 124 determines that a vNF has failed, in this case vNF 120 as indicated in FIG. 5 experiences a fault, it transmits a REMOVE message to vNF chaining manager 104 as shown in step 502. In response to the REMOVE message, vNF chaining manager 104 transmits a NOTIFY message at step 504 to vNF chaining client 118 and at step 506 to vNF chaining client 114 of vNFs 116 and 112 respectively, indicating that vNF 120 has been removed.

Figure 6:
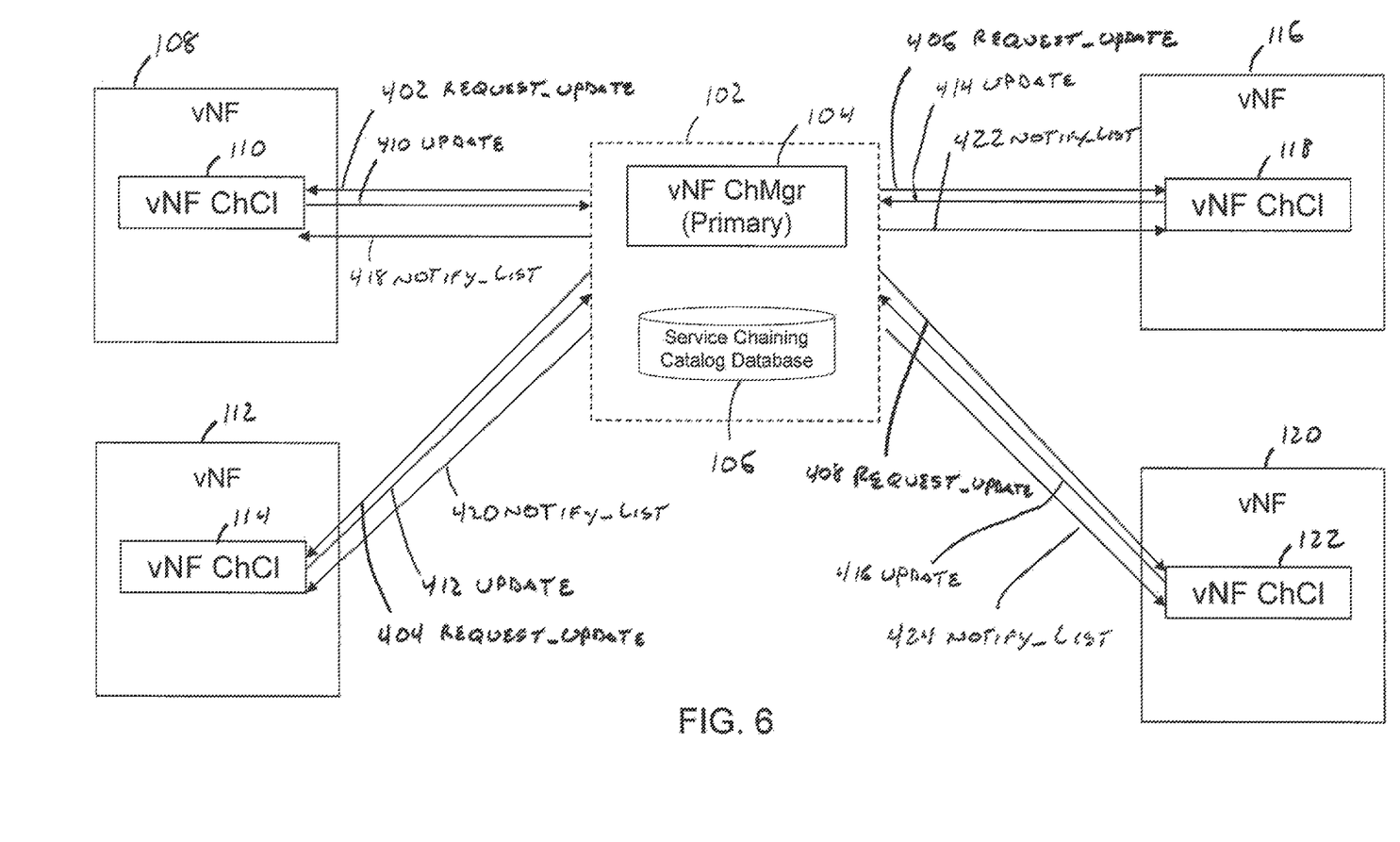
FIG. 6 depicts a call flow of messages transmitted among multiple vNF chaining clients and a vNF chaining manager according to one embodiment when a global configuration audit is requested according to one embodiment.

FIG. 6 depicts a call flow of messages transmitted among multiple vNF chaining clients and a vNF chaining manager according to one embodiment when a global configuration audit is requested according to one embodiment. A global configuration audit can be requested by, for example, a system administrator or other management person or entity in order to re-sync a peering configuration across a virtual service platform. In one embodiment, vNF chaining manager requests updated configuration from multiple vNF chaining clients. This is performed by vNF chaining manager 104 transmitting REQUEST_UPDATE messages to vNF chaining clients 110, 114, 118, 122 of vNFs 108, 112, 116, 120, respectively, at steps 402, 404, 406, and 408. In response to the REQUEST_UPDATE messages, at steps 410, 412, 414, and 416, vNFs 108, 112, 116, 120 transmit UPDATE messages to vNF chaining manager 104. At steps 418, 420, 422, and 424, vNF chaining manager 104 transmits NOTIFY_LIST messages to vNF chaining clients 110, 114, 118, 122 in order to provide vNFs 108, 112, 116, and 120 with current information regarding peering vNFs.

In one embodiment, a service chaining catalog is stored in service chaining catalog database 106. The service chaining catalog contains information related to an application including the vNFs the application is associated with and other applications that are considered peering applications to one or more related applications. The service chaining catalog can be constructed by a service vNF designer and can be provided to a vNF chaining manager when a service platform is to be instantiated. In one embodiment, based on information in the service chaining catalog, the vNF chaining manager can decide automatically how many other peering application vNFs to transmit NOTIFY messages to when a new vNF is instantiated and added to a platform.

In one embodiment, each record of the service chaining catalog comprises multiple fields including applicationType, tenantID, applicationDeploymentZone, applicationNetworkDomain, listOfPeerApplication, and listOfApplicationVNFs. In one embodiment, each field contains information as follows. The applicationType field contains information identifying the application the record is associated with. The tenantID field contains information identifying a particular tenant designation. In one embodiment, it is optional to place information in the tenantID field. An identification of a tenant stored in this field indicates that peering is applicable within the same tenant. The applicationDeploymentZone field contains information identifying a particular deployment zone designation. In one embodiment, it is optional to place information in the applicationDeploymentZone field. An identification stored in this field indicates that peering is applicable within the identified deployment zone. The applicationNetworkDomain field contains information identifying a particular network domain designation. In one embodiment, it is optional to place information in the applicationNetworkDomain field. An identification stored in this field indicates that peering is applicable within the identified network domain. The listOfPeerApplication field comprises a list of pointers to other application objects to which the particular application has a peering relationship. This field identifies other application objects which should receive configuration information pertaining to the particular application. The ListOfApplicationVNFs contains a list of existing virtual network function (vNF) instances and pointers to configuration parameter data of each existing vNF instance.

In one embodiment, the configuration parameter data of each application vNF as described above are considered transparent to the vNF chaining manager (such as vNF chaining manager 104. This means that the content of data transmitted from and received by vNF chaining manager is not necessarily understood, interpreted, or used by the vNF chaining manager and is only used by peering applications and/or vNFs. Similarly, vNF chaining clients may not understand, interpret, or use data received by or transmitted from the vNF chaining client.

In one embodiment, database 106 also stores records pertaining to a vNF chaining profile of a related vNF. The vNF chaining profile can be constructed by a vNF developer based on a common data schema to exchange its configuration information with peer vNFs. In one embodiment, each vNF chaining profile record comprises multiple fields including vNF ID, applicationType, tenantID, applicationDeploymentZone, applicationNetworkDomain, and vNF_configuration_object. In one embodiment, each field contains information as follows. The vNFID field contains information identifying a particular vNF. The applicationType field contains information identifying the application the record is associated with. The tenantID field contains information identifying a particular tenant designation. The applicationDeploymentZone field contains information identifying a particular deployment zone designation. The applicationNetworkDomain field contains information identifying a particular network domain designation. In one embodiment, the tenantID field, applicationDeploymentZone, and the applicationNetworkDomain fields are provided to allow peering application vNFs to decide whether or not the vNF identified by a particular record is of interest (i.e., should be considered a peering vNF). In one embodiment, the vNF_configuration_object field contains configuration parameter data that are understood and used by peering application vNFs. In one embodiment, the data in the vNFChainingProfile can be updated each time a vNF is instantiated, removed, or changed. In one embodiment, linkage from the serviceChainingCatalog to the vNFChainingProfile is provided via the listOfApplicationVNFs field. In one embodiment, the listOfApplicationVNFs filed contains a list of pointers. Each pointer points to a specific group of data of a vNFChainingProfile for a vNF. In one embodiment, each specific group of data contains the vNF_configuration_obj for a particular instance of a vNF.

Figure 7:
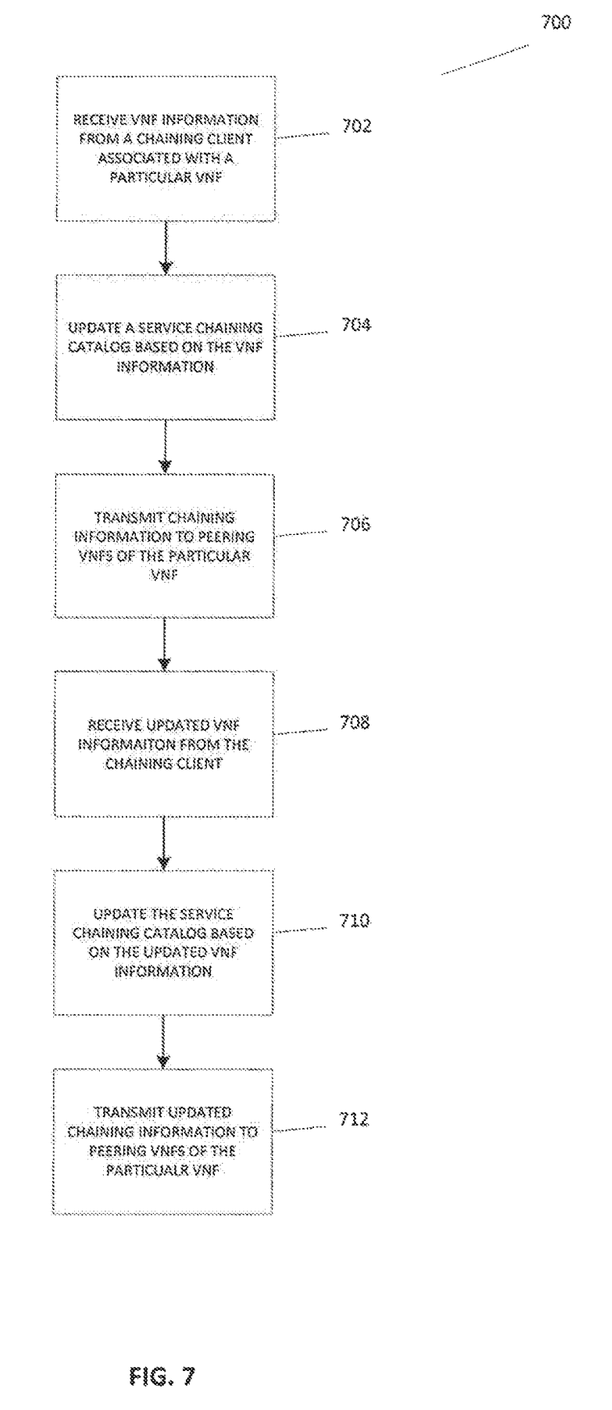
FIG. 7 depicts a flowchart of a method for virtualized network function management according to one embodiment.

FIG. 7 depict a flowchart of method 700 for vNF chaining management according to one embodiment. At step 702, a vNF chaining manager (e.g., vNF chaining manager 104 of FIG. 1) receives vNF information from a vNF chaining client (e.g., vNF chaining client 110 of FIG. 1) associated with a particular vNF (e.g., vNF 108 of FIG. 1). In one embodiment, the vNF chaining manager receives vNF information from the vNF chaining client in the form of an ADD_NEW message as described above. In other embodiments, the vNF chaining manager may receive information from the vNF chaining client via other messages, such as UPDATE, SUBSCRIBE, and/or REMOVE messages.

At step 704, the vNF chaining manager updates a service chaining catalog based on the vNF information. At step 706, the vNF chaining manager transmits chaining information to peering vNFs of the particular vNF.

At step 708, the vNF chaining manager receives updated vNF information from the chaining client. In one embodiment, this information may be transmitted from the vNF chaining client to the vNF chaining manager via an UPDATE message. At step 710, the vNF chaining manager updates the service chaining catalog based on the updated vNF information. At step 712, the vNF chaining manager transmits updated chaining information to peering vNFs of the particular vNF.

In one embodiment, information concerning how to implement a vNF chaining client can be provided to application developers so that the developers can implement a vNF chaining client in each vNF of an application.

It should be noted that messages can be broadcast from vNF chaining manager to all vNF chaining clients in communication with the vNF chaining manager. In one embodiment, messages are broadcast from the vNF chaining manager to all vNF chaining clients and the vNF chaining clients can determine whether the broadcast message is intended for them and take appropriate action as necessary. In one embodiment, vNF chaining manager determines one or more vNF chaining clients which should receive a particular message and such messages are transmitted only to the appropriate vNF chaining clients.

The vNF chaining manager and service chaining catalog database (e.g., vNF chaining manager 104 and service chaining catalog database 106) may be mirrored by a backup or secondary vNF chaining manager and service chaining catalog database. In one embodiment, the backup vNF chaining manager and service chaining catalog database are located on a same server as the primary vNF chaining manager and service chaining catalog database. In one embodiment, the backup vNF chaining manager and service chaining catalog database are located on a separate server (e.g., computer) and can be located remotely (e.g., geographically remote) from the primary vNF chaining manager and service chaining catalog database.

Figure 8:
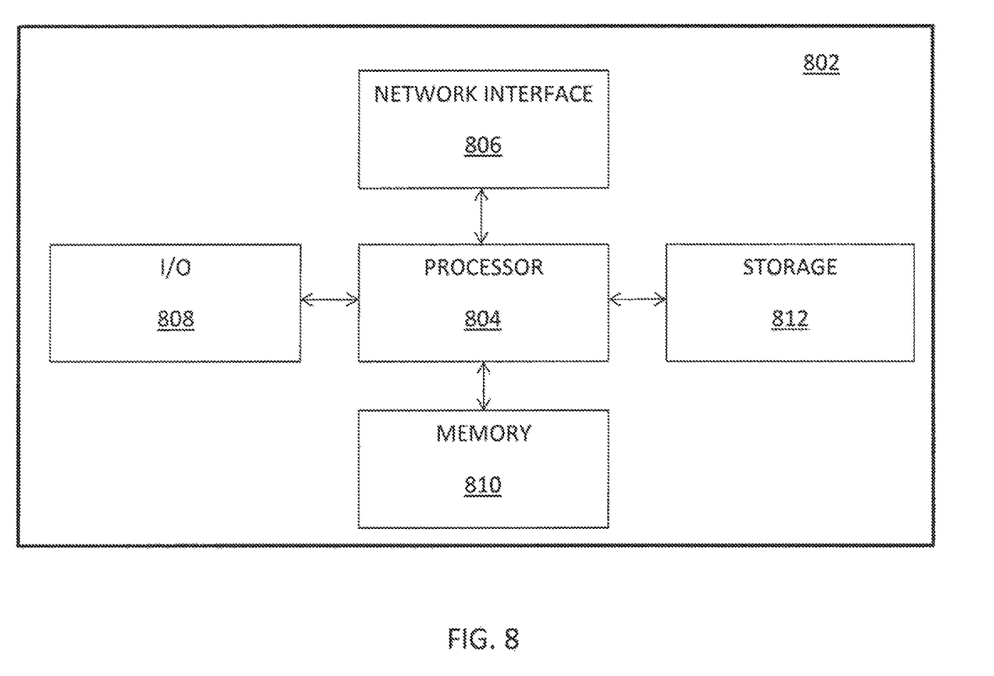
FIG. 8 depicts a high level block diagram of a computer according to one embodiment for implementing a server shown in FIG. 1 and the method of FIG. 7.

Server 102 and hardware on which virtualized network functions (e.g., vNFs 108, 112, 116, 120 can be executed may be implemented using a computer A high-level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.), and loaded into memory 810 when execution of the computer program instructions is desired. Thus, the method steps of FIG. 7 can be defined by the computer program instructions stored in the memory 810 and/or storage 812 and controlled by the processor 804 executing the computer program instructions. For example, the computer program instructions can be implemented as computer executable code programmed by one skilled in the art to perform an algorithm defined by the method steps of FIG. 7. Accordingly, by executing the computer program instructions, the processor 804 executes an algorithm defined by the method steps of FIG. 7. The computer 802 also includes one or more network interfaces 806 for communicating with other devices via a network. The computer 802 also includes input/output devices 808 that enable user interaction with the computer 802 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method, comprising:
   receiving, by a chaining manager comprising a processor, chaining information from a first instantiation at a first peering chaining manager based on the chaining information from the first instantiation at the first peering chaining node;
   updating, by the chaining manager, chaining information stored in a chaining catalog of the chaining;
   receiving, by the chaining manager, chaining information from a second instantiation at a second peering chaining node;
   updating, by the chaining manager, the chaining information stored in the chaining catalog of the chaining manager based on the chaining information from the second instantiation at the second peering chaining node, the updating resulting in updated chaining information; and
   transmitting, by the chaining manager, the updated chaining information to the first peering chaining node.

2. The method of claim 1, wherein the updated chaining information comprises information associated with prior instantiations.

3. The method of claim 1, wherein the chaining information comprises information associated with all instantiations that have occurred at any peering chaining node.

4. The method of claim 1, wherein each peering chaining node stores chaining information received from the chaining manager.

5. The method of claim 1, wherein the first instantiation and the second instantiation comprise instantiation of a virtualized network function.

6. The method of claim 5, wherein the chaining information comprises configuration parameters pertaining to the virtualized network function.

7. The method of claim 6, wherein the configuration parameters identify possible interactions with the virtualized network function.

8. A chaining manager comprising:
   a processor; and
   a memory to store computer program instructions, the computer program instructions when executed on the processor cause the processor to perform operations comprising:
   receiving chaining information from a first instantiation at a first peering chaining node;
   updating chaining information stored in a chaining catalog of the chaining manager based on the chaining information from the first instantiation at the first peering chaining node;
   receiving chaining information from a second instantiation at a second peering chaining node;
   updating the chaining information stored in the chaining catalog of the chaining manager based on the chaining information from the second instantiation at the second peering chaining node, the updating resulting in updated chaining information; and
   transmitting the updated chaining information to the first peering chaining node.

9. The chaining manager of claim 8, wherein the updated chaining information comprises information associated with prior instantiations.

10. The chaining manager of claim 8, wherein the chaining information comprises information associated with all instantiations that have occurred at any peering chaining node.

11. The chaining manager of claim 8, wherein each peering chaining node stores chaining information received from the chaining manager.

12. The chaining manager of claim 8, wherein the first instantiation and the second instantiation comprise instantiation of a virtualized network function.

13. The chaining manager of claim 12, wherein the chaining information comprises configuration parameters pertaining to the virtualized network function.

14. The chaining manager of claim 13, wherein the configuration parameters identify possible interactions with the virtualized network function.

15. A non-transitory computer readable medium storing computer program instructions for operating a chaining manager, which, when executed on a processor, cause the processor to perform operations comprising:
   receiving chaining information from a first instantiation at a first peering chaining node;
   updating chaining information stored in a chaining catalog of the chaining manager based on the chaining information from the first instantiation at the first peering chaining node;
   receiving chaining information from a second instantiation at a second peering chaining node;
   updating the chaining information stored in the chaining catalog of the chaining manager based on the chaining information from the second instantiation at the second peering chaining node, the updating resulting in updated chaining information; and
   transmitting the updated chaining information to the first peering chaining node.

16. The non-transitory computer readable medium of claim 15, wherein the updated chaining information comprises information associated with prior instantiations.

17. The non-transitory computer readable medium of claim 15, wherein the chaining information comprises information associated with all instantiations that have occurred at any peering chaining node.

18. The non-transitory computer readable medium of claim 15, wherein each peering chaining node stores chaining information received from the chaining manager.

19. The non-transitory computer readable medium of claim 15, wherein the first instantiation and the second instantiation comprise instantiation of a virtualized network function.

20. The non-transitory computer readable medium of claim 19, wherein the chaining information comprises configuration parameters pertaining to the virtualized network function.

\* \* \* \* \*